(12) United States Patent
Alcalay et al.

(10) Patent No.: US 11,747,170 B2
(45) Date of Patent: Sep. 5, 2023

(54) METHOD AND SYSTEM FOR ESTIMATING AN ANGULAR DEVIATION FROM A REFERENCE GUIDANCE AXIS, A POSITION AND A VELOCITY OF AN AIRCRAFT

(71) Applicants: Airbus SAS, Blagnac (FR); Airbus Operations SAS, Toulouse (FR)

(72) Inventors: Guillaume Alcalay, Toulouse (FR); Thierry Bourret, Toulouse (FR); Imad Lebbos, Toulouse (FR); Michel Padovani, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 194 days.

(21) Appl. No.: 17/345,454

(22) Filed: Jun. 11, 2021

(65) Prior Publication Data

US 2021/0396545 A1    Dec. 23, 2021

(30) Foreign Application Priority Data

Jun. 19, 2020   (FR) ...................................... 2006443

(51) Int. Cl.
  *G01C 21/20*  (2006.01)
  *G01C 23/00*  (2006.01)
  *G01P 3/00*   (2006.01)
  *G07C 5/02*   (2006.01)

(52) U.S. Cl.
  CPC .......... *G01C 23/005* (2013.01); *G01C 21/20* (2013.01); *G01P 3/00* (2013.01); *G07C 5/02* (2013.01)

(58) Field of Classification Search
  CPC ......... G01C 23/005; G01C 21/20; G01P 3/00; G07C 5/02
  See application file for complete search history.

(56) References Cited

U.S. PATENT DOCUMENTS

| | | |
|---|---|---|
| 6,178,363 B1 | 1/2001 | McIntyre et al. |
| 6,522,266 B1 | 2/2003 | Soehren et al. |
| 2014/0229039 A1 | 8/2014 | Murphy |
| 2015/0081143 A1* | 3/2015 | Snow ................... G08G 5/0021 701/16 |
| 2016/0328982 A1 | 11/2016 | Jeong et al. |

(Continued)

FOREIGN PATENT DOCUMENTS

| | | |
|---|---|---|
| EP | 1014104 A2 | 6/2000 |
| EP | 2765389 A1 | 8/2014 |

OTHER PUBLICATIONS

French Search Report; priority document.

*Primary Examiner* — Peter D Nolan
*Assistant Examiner* — Demetra R Smith-Stewart
(74) *Attorney, Agent, or Firm* — Greer, Burns & Crain, Ltd.

(57) ABSTRACT

A method and system for estimating an angular deviation from a reference guidance axis, a position and a velocity of an aircraft. The system includes an offset collection module for collecting an offset measured by a measurement module, a position vector collection module for collecting a position vector measured by a position vector measurement module, a velocity vector collection module, a module for estimating the angular deviation of a reference guidance axis with respect to the approach axis towards the runway, for estimating the position of the aircraft with respect to the runway and for estimating the velocity of the aircraft with respect to the runway.

14 Claims, 3 Drawing Sheets

(56) References Cited

U.S. PATENT DOCUMENTS

2016/0379502 A1\* 12/2016 Lepage ................ G01C 23/005
              701/16
2018/0238709 A1   8/2018 Aucoin et al.
2019/0031361 A1\* 1/2019 McCullough ........... B64C 27/57

\* cited by examiner

METHOD AND SYSTEM FOR ESTIMATING AN ANGULAR DEVIATION FROM A REFERENCE GUIDANCE AXIS, A POSITION AND A VELOCITY OF AN AIRCRAFT

CROSS-REFERENCES TO RELATED APPLICATIONS

This application claims the benefit of the French patent application No. 2006443 filed on Jun. 19, 2020, the entire disclosures of which are incorporated herein by way of reference.

FIELD OF THE INVENTION

The present invention relates to a method and system for estimating an angular deviation from a reference guidance axis, a position and a velocity of an aircraft during an approach procedure with a view to landing on a runway.

BACKGROUND OF THE INVENTION

For each runway of an airport, there are generally one or more predefined approaches that are published on aeronautical charts. Each predefined approach has a corresponding reference approach trajectory, which is characterized, in particular, by an approach axis towards the runway under consideration. This approach axis may be defined by a lateral component and by a vertical component. The lateral component is generally aligned with a longitudinal axis of the runway. The vertical component of the approach axis generally forms an angle of 3° with the runway.

During an approach procedure towards a runway of an airport, in accordance with a predefined approach towards the runway, an aircraft may be guided so as to land on the runway by a radio navigation system. This radio navigation system may correspond to an instrument landing system ILS. The ILS system comprises at least one transmitter station located on the ground, configured so as to transmit guidance signals allowing the aircraft to get close to the approach axis corresponding to the predefined approach. These signals, also called descent alignment signals, include, in particular, a lateral guidance signal allowing the aircraft to ascertain the lateral offset that it has with respect to the reference approach trajectory (offset with respect to the lateral component of the approach axis). This lateral guidance signal is generally called "localizer signal". There is also a vertical guidance signal allowing the aircraft to ascertain the vertical offset that it has with respect to the reference approach trajectory (offset with respect to the vertical component of the approach axis). This vertical guidance signal is generally called "glide signal" or "glide slope signal".

The transmitter stations transmitting these signals are inspected regularly by local authorities. The purpose of these inspections is to guarantee that the accuracy of the signals transmitted by the ground transmitter stations to the ILS system is in accordance with the standards of the International Civil Aviation Organization ICAO.

However, there may be an angular deviation between the reference guidance axis determined by the ILS system on board the aircraft based on the (lateral and vertical) guidance signals received from a transmitter station, on the one hand, and the approach axis corresponding to the predefined approach towards the runway, on the other hand. Likewise, there may be a bias on the position and velocity measurements of the aircraft, which have been measured respectively by a geopositioning measurement module and by an inertial measurement module.

SUMMARY OF THE INVENTION

The present invention aims to overcome these drawbacks by proposing a system and a method that make it possible to estimate the angular deviation and also the position and the velocity of an aircraft.

To this end, the invention relates to a method for estimating, during an approach procedure of an aircraft with a view to landing on a runway in accordance with a predefined approach towards the runway, an angular deviation of a reference guidance axis with respect to an approach axis corresponding to the predefined approach towards the runway, and also a position and a velocity of the aircraft with respect to the runway, the approach procedure being performed using a landing assistance device, the landing assistance device comprising at least one transmitter station configured so as to transmit a reference guidance signal defining the reference guidance axis, the runway having a threshold, the approach procedure comprising a capturing phase comprising making the aircraft converge towards the reference guidance axis and a tracking phase comprising guiding the aircraft along the reference guidance axis.

According to the invention, the method comprises at least one set of steps implemented iteratively, the set of steps implemented in each iteration comprising:

- an offset collection step, implemented by an offset collection module, comprising collecting an offset measured by an offset measurement module based on the reference guidance signal transmitted by the transmitter station;
- a position vector collection step, implemented by a position vector collection module, comprising collecting a position vector of the aircraft measured by a position vector measurement module based on signals transmitted by a geopositioning system, the position vector of the aircraft being expressed with respect to the threshold of the runway, the position vector comprising a longitudinal position, a lateral position and a vertical position;
- a velocity vector collection step, implemented by a velocity vector collection module, comprising collecting a velocity vector of the aircraft measured by a velocity vector inertial measurement module, the velocity vector comprising a longitudinal velocity, a lateral velocity and a vertical velocity;
- an information determination step, implemented by an information determination module, comprising determining at least the following information, using an estimator filter, based on the position vector, based on the velocity vector, based on the offset determined in the current iteration and based at least on an offset determined and stored in at least one previous iteration:
  - an estimate of the angular deviation of the reference guidance axis with respect to the approach axis towards the runway,
  - an estimate of the position of the aircraft with respect to the runway and
  - an estimate of the velocity of the aircraft with respect to the runway;
- a storage step, implemented by a storage module, comprising storing at least the offset and the position vector that are determined in the current iteration.

Thus, by virtue of the method, the angular deviation between the reference guidance axis determined by the ILS system based on the guidance signal, on the one hand, and the approach axis towards the runway, on the other hand, is able to be estimated. Likewise, the position and the velocity of the aircraft with respect to the runway are also able to be estimated. Jointly estimating the angular deviation from the guidance axis and also the position and the velocity of the aircraft using the estimator filter makes it possible to obtain high accuracy for the various estimated values. Specifically, by virtue of this joint estimation, the estimate of one of the values is not impacted by the biases that exist on the other of the values. In particular, the estimate of the position of the aircraft with respect to the runway is thus robust firstly to biases that impact the position vector and secondly to alignment biases of the ILS guidance axis with respect to the approach axis towards the runway (the latter biases being likely to worsen the accuracy of the offsets measured by the offset measurement module).

According to a first alternative, the estimate of the position of the aircraft with respect to the runway corresponds to an estimate of the position of the aircraft expressed with respect to the threshold of the runway, for example in an orthonormal reference system whose origin corresponds to the runway threshold, and the estimate of the velocity of the aircraft with respect to the runway corresponds to an estimate of the velocity of the aircraft expressed with respect to the threshold of the runway, for example in an orthonormal reference system whose origin corresponds to the runway threshold.

According to a second alternative, the estimate of the position of the aircraft with respect to the runway corresponds to an estimate of the position of the aircraft with respect to the reference guidance axis, and the estimate of the velocity of the aircraft with respect to the runway corresponds to an estimate of the velocity of the aircraft with respect to the reference guidance axis.

According to a first variant, the method comprises:
a diagnostic step, implemented by a diagnostic module, comprising validating or not validating the offset measurement module and the position vector measurement module based on the information determined in the information determination step, a measurement module being considered to be valid if no fault is detected with the measurement module, a measurement module being considered not to be valid if a fault is detected with the measurement module, the velocity vector inertial measurement module being considered to be always valid;
a reconfiguration step, implemented by a reconfiguration module, comprising reconfiguring the estimator filter for the following iteration in order to eliminate a measurement performed by the one or more measurement modules considered not to be valid.

According to a second variant, the method comprises a reclassification step, implemented by a reclassification module, comprising reclassifying the one or more measurement modules for which a fault was detected in the diagnostic step implemented in a previous iteration, the reclassification step preceding the reconfiguration step.

Moreover, with the estimator filter being a Kalman filter, the reconfiguration step comprises the following sub-steps:
a validity sub-step, implemented by a validity submodule, comprising synthesizing the validity of the offset measurement module, of the position vector measurement module and of the velocity vector inertial measurement module;
a storage sub-step, implemented by a storage submodule, comprising managing the storage implemented in the storage step by storing:
the offset and the position at the start of the capturing phase when the offset complies with predetermined validity features,
the offset and the position at the start of the tracking phase;
an observability sub-step, implemented by an observability submodule, comprising formulating a strategy for setting certain states on the basis of the phase of the approach:
by setting the bias of the position of the aircraft to zero in the capturing phase,
by setting the sensitivity factor bias to its last value or to its average in the tracking phase,
by interpolating the bias of the position of the aircraft, following a predetermined number of iterations after which the bias began to be estimated;
an adaptation sub-step, implemented by an adaptation submodule, comprising adapting covariance matrices associated with the Kalman filter on the basis of the validities synthesized in the validity sub-step and of the setting strategy formulated in the observability step.

In a first embodiment, the offset is a lateral offset. The estimator filter is then preferably a Kalman filter based on the following state vector:

$$X = \begin{pmatrix} y_{RWY} \\ b_{align} \\ b_{LOC_{sensi}} \\ b_{vy_{IRS}} \\ b_{y_{GNSS}} \\ b_{vx_{IRS}} \end{pmatrix},$$

on the following observation vector:

$$Y = \begin{pmatrix} y_{GNSS} \\ \eta_{LOC} \\ (\eta_{LOC_{mem_i}})_{1 \leq i \leq N} \end{pmatrix},$$

on the following state equation:

$$\dot{X} = \begin{pmatrix} \sqrt{(vx_{IRS} - b_{vx_{IRS}})^2 + (vy_{IRS} - b_{vy_{IRS}})^2 + vz_{IRS}^2} \sin\left(QFU - \arctan\left(\frac{vy_{IRS} + b_{vy_{IRS}}}{vx_{IRS} + b_{vx_{IRS}}}\right)\right) - b_{vy_{IRS}} \\ 0 \\ 0 \\ 0 \\ 0 \\ 0 \end{pmatrix}$$

and on the following observation equation:

$$Y = \begin{pmatrix} y_{RWY} - b_{y_{GNSS}} \\ \frac{L}{(0.7 - b_{LOC_{sensi}})(L - x_{RWY})}[y_{RWY} - d_{offset} - (L - x_{RWY})\sin(b_{align})] \\ \left(\frac{L}{(0.7 - b_{LOC_{sensi}})(L - x_{mem_i})}[y_{mem_i} - b_{y_{GNSS}} - d_{offset} - (L - x_{RWY_{mem_i}})\sin(b_{align})]\right)_{1 \leq i \leq N} \end{pmatrix}$$

in which:

$x_{RWY}$ corresponds to a longitudinal position of the aircraft with respect to the threshold of the runway, $y_{RWY}$ corresponds to a lateral position of the aircraft with respect to the threshold of the runway, $b_{align}$ corresponds to an angular deviation of the reference lateral guidance axis with respect to the longitudinal axis of the runway, $b_{LOC_{sensi}}$ corresponds to a sensitivity factor bias of the reference lateral guidance signal with respect to the standardized sensitivity factor of 0.7, $vx_{IRS}$ corresponds to the longitudinal velocity of the aircraft collected by the velocity vector collection module, $vy_{IRS}$ corresponds to the lateral velocity of the aircraft collected by the velocity vector collection module, $vz_{IRS}$ corresponds to the vertical velocity of the aircraft collected by the velocity vector collection module, $b_{vx_{IRS}}$ corresponds to a bias of the longitudinal velocity of the aircraft collected by the velocity vector collection module, $b_{vy_{IRS}}$ corresponds to a bias of the lateral velocity of the aircraft collected by the velocity vector collection module, $b_{y_{GNSS}}$ corresponds to a bias of the lateral position of the aircraft measured by the position vector measurement module, $y_{GNSS}$ corresponds to the lateral position collected by the position vector collection module, $\eta_{LOC}$ corresponds to the lateral offset measured by the offset measurement module in microamperes and collected by the offset collection module, $(\eta_{LOC_{mem_i}})_{1 \leq i \leq N}$ corresponds to a vector comprising at least one lateral offset $\eta_{LOC_{mem_i}}$ measured in microamperes, stored and collected in the lateral offset collection step in an iteration i prior to the current iteration, N corresponding to a predetermined number of lateral offsets measured and stored in iterations prior to the current iteration, $x_{mem_i}$ and $y_{mem_i}$ correspond respectively to a longitudinal position and a lateral position of the aircraft with respect to the threshold of the runway, stored and collected in the lateral offset collection step prior to the current iteration and in the same iteration as the lateral offset $\eta_{LOC_{mem_i}}$, L corresponds to a distance between the threshold of the runway and an orthogonal projection of the position of the transmitter station onto the longitudinal axis of the runway, $d_{offset}$ corresponds to a distance between the position of the transmitter station and the longitudinal axis of the runway, QFU corresponds to a geometric orientation of the runway.

Moreover, the information determined in the information determination step furthermore comprises:
estimates of the following variables:
the longitudinal position of the aircraft with respect to the threshold of the runway,
the angular deviation of the reference lateral guidance axis with respect to the longitudinal axis of the runway,
the bias pertaining to the sensitivity factor,
the bias of the lateral velocity of the aircraft,
the bias of the lateral position of the aircraft measured by the position vector measurement module,
the bias of the longitudinal velocity of the aircraft,
innovation terms for the following variables:
the lateral position of the aircraft collected in the position vector collection step,
the lateral offset collected in the lateral offset collection step,
a vector comprising at least one lateral offset, stored and collected in the lateral offset collection step in an iteration prior to the current iteration;
an estimate error covariance matrix;
a covariance matrix associated with the innovation terms.

An innovation term corresponds to the difference between a measurement and a predicted value for the measurement. This predicted value corresponds for example to a value estimated in the determination step.

In a second embodiment, the offset is a vertical offset. The estimator filter is then preferably a Kalman filter based on the following state vector:

$$X = \begin{pmatrix} z_{RWY} \\ b_{GPA} \\ b_{GS_{sensi}} \\ b_{z_{GNSS}} \\ b_{vz_{IRS}} \end{pmatrix},$$

on the following observation vector:

$$Y = \begin{pmatrix} z_{GNSS} \\ \eta_{GS_{ddm}} \\ (\eta_{GS_{ddm_{mem_i}}})_{1 \leq i \leq N} \end{pmatrix},$$

on the following state equation:

$$\dot{X} = \begin{pmatrix} vz_{IRS} - b_{vz_{IRS}} \\ 0 \\ 0 \\ 0 \\ 0 \\ 0 \end{pmatrix},$$

and on the following observation equation:

$$Y = \begin{pmatrix} z_{RWY} - b_{z_{GNSS}} \\ \operatorname{sgn}(\eta_{GS_{rad}}) f(\eta_{GS_{rad}}, b_{GS_{sensi}}, b_{GPA}) \\ \left( \operatorname{sgn}(\eta_{GS_{rad}}) f\left(\eta_{GS_{rad_{mem_i}}}, b_{GS_{sensi}}, b_{GPA}\right) \right)_{1 \le i \le N} \end{pmatrix},$$

where:

$$\begin{pmatrix} \eta_{GS_{rad}} \\ \eta_{GS_{rad_{mem_i}}} \end{pmatrix} = \begin{pmatrix} GPA - b_{GPA} - \arctan\left[ \dfrac{(vz_{IRS} - b_{vz_{IRS}}) dt + z_{RWY}}{x_{RWY} + \dfrac{TCH}{\tan(GPA - b_{GPA})}} \right] \\ GPA - b_{GPA} - \arctan\left[ \dfrac{z_{mem_i} - b_{z_{GNSS}}}{x_{mem_i} + \dfrac{TCH}{\tan(GPA - b_{GPA})}} \right] \end{pmatrix},$$

where $f(\eta_{GS_{rad}}, b_{GS_{sensi}}, b_{GPA})$ and $f\left(\eta_{GS_{rad_{mem_i}}}, b_{GS_{sensi}}, b_{GPA}\right)$ are expressed according to the relationship:
or $$f(\eta_{GS_{rad}}, b_{GS_{sensi}}, b_{GPA}) = \frac{0.0875 \eta_{GS_{rad}}}{(0.12 - b_{GS_{sensi}})(GPA - b_{GPA})}$$

and $$f\left(\eta_{GS_{rad_{mem_i}}}, b_{GS_{sensi}}, b_{GPA}\right) = \frac{0,0875 \eta_{GS_{rad_{mem_i}}}}{(0.12 - b_{GS_{sensi}})(GPA - b_{GPA})},$$

or if $|\eta_{GS_{dmm}}| \le 0.0875$ and $\left|\eta_{GS_{dmm_{mem_i}}}\right| \le 0.0875$, $$f(\eta_{GS_{rad}}, b_{GS_{sensi}}, b_{GPA}) = \frac{0,0875 \eta_{GS_{rad}}}{(0.12 - b_{GS_{sensi}})(GPA - b_{GPA})}$$

and $$f\left(\eta_{GS_{rad_{mem_i}}}, b_{GS_{sensi}}, b_{GPA}\right) = \frac{0,0875 \eta_{GS_{rad_{mem_i}}}}{(0.12 - b_{GS_{sensi}})(GPA - b_{GPA})},$$

otherwise $$f(\eta_{GS_{rad}}, b_{GS_{sensi}}, b_{GPA}) =$$

$$0.0875 + \frac{(0.22 - 0.0875)(|\eta_{GS_{rad}}| - 0.12 + b_{GS_{sensi}})}{1 - 0.12 + b_{GS_{sensi}} - 0.5(0.3 + 0.45)}$$

and $$f\left(\eta_{GS_{rad_{mem_i}}}, b_{GS_{sensi}}, b_{GPA}\right) =$$

$$0.0875 + \frac{(0.22 - 0.0875)\left(\left|\eta_{GS_{rad_{mem_i}}}\right| - 0.12 + b_{GS_{sensi}}\right)}{1 - 0.12 + b_{GS_{sensi}} - 0.5(0.3 + 0.45)};$$

in which:

$z_{RWY}$ corresponds to a vertical position of the aircraft with respect to the threshold of the runway, GPA corresponds to an angle of the nominal descent trajectory axis with respect to the runway, $b_{GPA}$ corresponds to an angular deviation of the reference vertical guidance axis with respect to a nominal descent trajectory axis, $b_{GS_{sensi}}$ corresponding to a bias pertaining to the reference sensitivity factor, defined at 0.12 by the ICAO, $b_{z_{GNSS}}$ corresponding to a bias of the vertical position of the aircraft collected by the position vector collection module, $z_{GNSS}$ corresponding to the vertical position collected by the position vector collection module, $\eta_{GS_{ddm}}$ corresponding to the vertical offset measured by the offset measurement module in DDM and collected by the offset collection module, $\eta_{GS_{rad}}$ corresponding to the vertical offset measured by the offset measurement module in radians and collected by the offset collection module, $\left(\eta_{GS_{ddm_{mem_i}}}\right)_{1 \le i \le N}$ corresponds to a vector comprising at least one vertical offset $\eta_{GS_{ddm_{mem_i}}}$ measured in DDM, stored and collected in the vertical offset collection step in an iteration i prior to the current iteration, N corresponding to a predetermined number of vertical offsets measured and stored in iterations prior to the current iteration, $\left(\eta_{GS_{rad_{mem_i}}}\right)_{1 \le i \le N}$ corresponds to a vector comprising at least one vertical offset $\eta_{GS_{ddm_{mem_i}}}$ measured in radians, stored and collected in the vertical offset collection step in an iteration i prior to the current iteration, N corresponding to a predetermined number of vertical offsets measured and stored in iterations prior to the current iteration, $vz_{IRS}$ corresponds to the vertical velocity of the aircraft collected in the velocity vector collection step, $b_{vx_{IRS}}$ corresponds to a bias of the vertical velocity of the aircraft collected in the velocity vector collection step, dt corresponds to a time between two iterations, QFU corresponds to a geometric orientation of the runway, TCH corresponds to an altitude with respect to the threshold of the runway at which the vertical offset is zero, $x_{RWY}$ corresponds to a longitudinal distance between the aircraft and the threshold of the runway, collected by the position vector collection module, $x_{mem_i}$ corresponds to the longitudinal position collected in the position vector collection step and stored in an iteration prior to the current iteration, in the same iteration as the vertical offset $$\eta_{GS_{ddm_{mem_i}}},$$

$z_{mem_i}$ corresponds to the vertical position collected in the position vector collection step and stored in an iteration prior to the current iteration, in the same iteration as the vertical offset $$\eta_{GS_{ddm_{mem_i}}}.$$

Moreover, the information determined in the information determination step furthermore comprises:
estimates of the following variables:
the vertical position of the aircraft with respect to the vertical position of the threshold of the runway,
the vertical offset in DDM of the aircraft,
the sensitivity factor,
the bias of the vertical position of the aircraft,
the bias of the vertical velocity of the aircraft;
innovation terms for the following variables:
the vertical position of the aircraft collected in the position vector collection step,
the vertical offset in DDM collected in the vertical offset collection step,
a vector comprising at least one vertical offset measured in DDM, stored and collected in the vertical offset collection step in an iteration prior to the current iteration;
an estimate error covariance matrix;
a covariance matrix associated with the innovation terms.

Furthermore, in the first embodiment, just as in the second embodiment, the diagnostic step comprises comparing each of the innovation terms determined in the information determination step with a threshold associated with the variable whose innovation term is determined, a fault with the position vector measurement module is detected if the innovation term for the position is greater than or equal to the associated threshold for a predetermined successive number of iterations, and a fault with the offset measurement module is detected if the innovation term for each of the offsets is greater than or equal to the associated threshold for a predetermined successive number of iterations.

In addition, the reclassification step comprises comparing each of the innovation terms determined in the information determination step with the predetermined associated threshold, a position vector measurement module is reclassified if the innovation term for the position is less than the associated threshold for a predetermined successive number of iterations, and an offset measurement module is reclassified if the innovation term for each of the offsets is less than the associated threshold for a predetermined successive number of iterations.

Without limitation, in the first embodiment, the associated threshold is determined at least based on the covariance matrix associated with the innovation terms or based on the covariance matrix of measured noise, the associated threshold being equal to the diagonal term of the covariance matrix associated with the innovation terms or of the covariance matrix of measured noise.

Without limitation, in the second embodiment, the associated threshold is determined at least based on the covariance matrix associated with the innovation terms using the following relationship:

$$T_{Kalman}=dYS^{-1}dY^T,$$

in which:

$T_{Kalman}$ corresponds to a vector comprising the thresholds associated with the variable whose innovation term is determined in the current iteration, dY corresponds to a vector of innovation terms determined based on the observation vector of the estimator filter in the current iteration, S corresponds to the covariance matrix of the innovation terms determined in the current iteration.

The invention also relates to a system for estimating, during an approach procedure of an aircraft with a view to landing on a runway in accordance with a predefined approach towards the runway, an angular deviation of a reference guidance axis with respect to an approach axis corresponding to the predefined approach towards the runway, and also a position and a velocity of the aircraft with respect to the runway, the approach procedure being performed using a landing assistance device, the landing assistance device comprising at least one transmitter station configured so as to transmit a reference guidance signal defining the reference guidance axis, the runway having a threshold, the approach procedure comprising a capturing phase comprising making the aircraft converge towards the reference guidance axis and a tracking phase comprising guiding the aircraft along the reference guidance axis.

According to the invention, the system comprises at least one set of modules implemented iteratively, the set of modules implemented in each iteration comprising:
an offset collection module configured so as to collect an offset measured by an offset measurement module based on the reference guidance signal transmitted by the transmitter station;
a position vector collection module configured so as to collect a position vector of the aircraft measured by a position vector measurement module based on signals transmitted by a geopositioning system, the position vector of the aircraft being expressed with respect to the threshold of the runway, the position vector comprising a longitudinal position, a lateral position and a vertical position;
a velocity vector collection module configured so as to collect a velocity vector of the aircraft measured by a velocity vector inertial measurement module, the velocity vector comprising a longitudinal velocity, a lateral velocity and a vertical velocity;
an information determination module configured so as to determine at least the following information, using an estimator filter, based on the position vector, based on the velocity vector, based on the offset determined in the current iteration and based at least on an offset determined and stored in at least one previous iteration:

an estimate of the angular deviation of the reference guidance axis with respect to the approach axis towards the runway, an estimate of the position of the aircraft with respect to the runway and an estimate of the velocity of the aircraft with respect to the runway;

a storage module configured so as to store at least the offset and the position vector that are determined in the current iteration.

According to the first variant, the system comprises:

a diagnostic module configured so as to validate or not validate the offset measurement module and the position vector measurement module based on the information determined by the information determination module, a measurement module being considered to be valid if no fault is detected with the measurement module, a measurement module being considered not to be valid if a fault is detected with the measurement module, the velocity vector inertial measurement module being considered to be always valid;

a reconfiguration module configured so as to reconfigure the estimator filter for the following iteration in order to eliminate a measurement performed by the one or more measurement modules considered not to be valid.

According to the second variant, the system comprises a reclassification module configured so as to reclassify the one or more measurement modules for which a fault was detected by the diagnostic module implemented in a previous iteration.

The invention also relates to an aircraft, in particular a transport plane, comprising an estimation system such as the one specified above.

BRIEF DESCRIPTION OF THE DRAWINGS

The invention, with its features and advantages, will become more clearly apparent upon reading the description provided with reference to the appended drawings, in which.

DETAILED DESCRIPTION OF THE PREFERRED EMBODIMENTS

Figure 1:
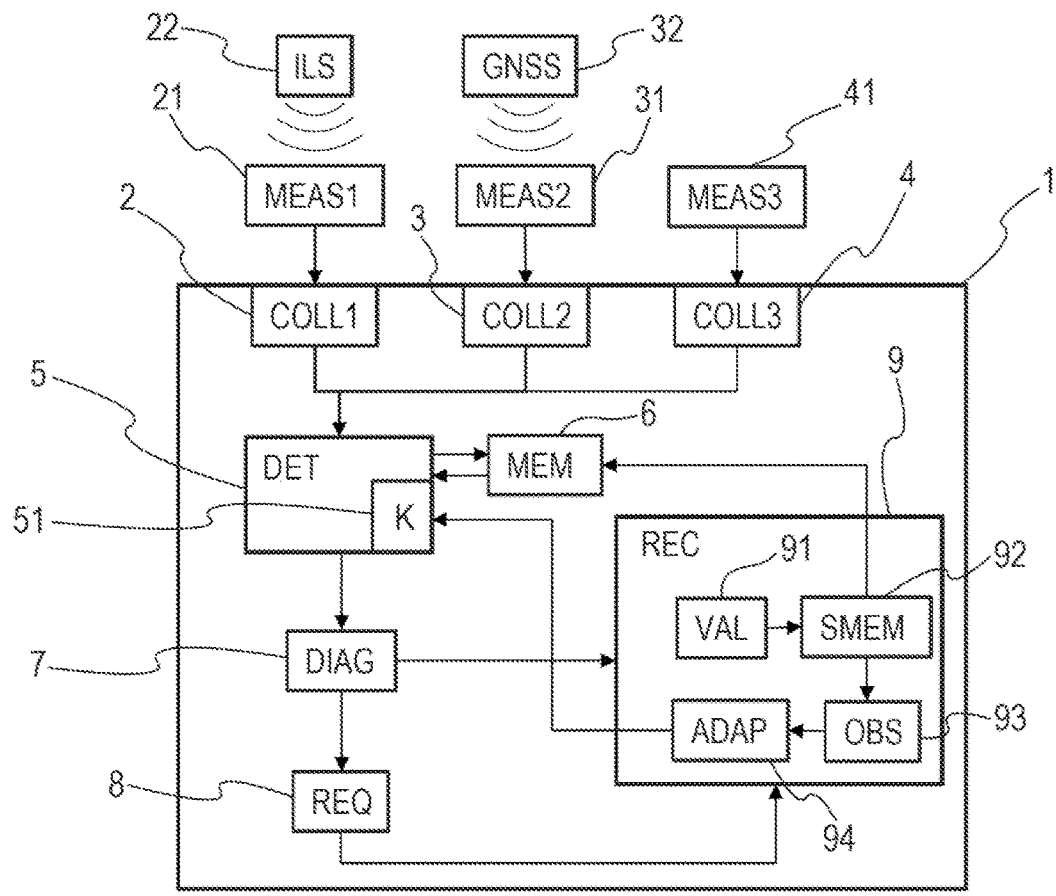
FIG. 1 shows a schematic view of the estimation system.
Figure 3A:
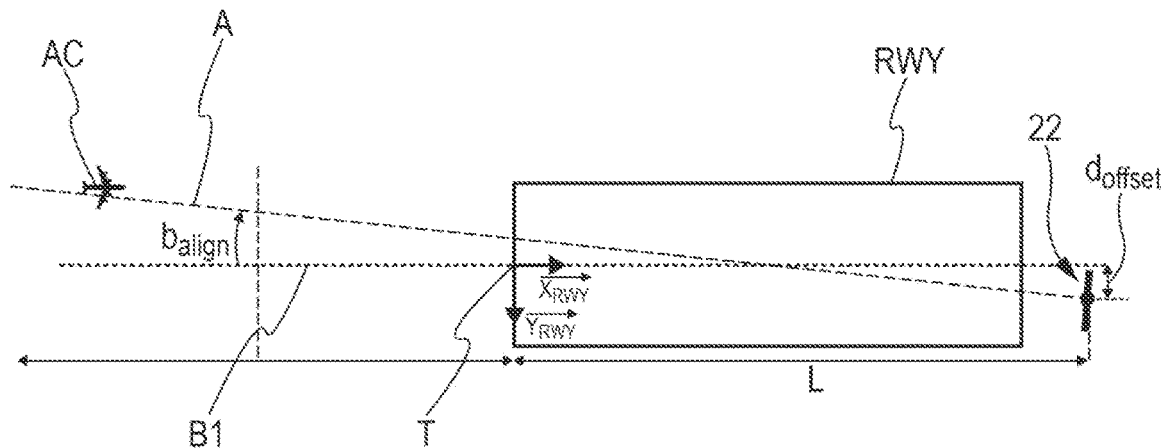
FIG. 3A shows a plan view of an aircraft during an approach procedure with a view to landing on a runway.
Figure 3B:
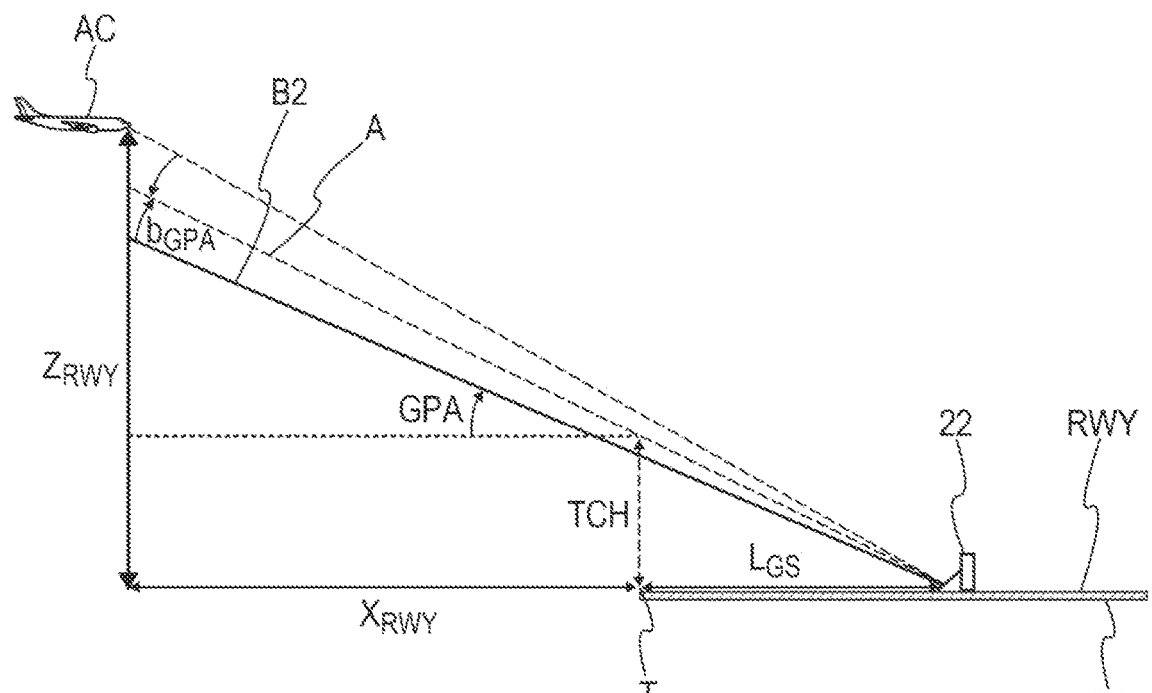
FIG. 3B shows a profile view of an aircraft during an approach procedure with a view to landing on a runway.
Figure 4:
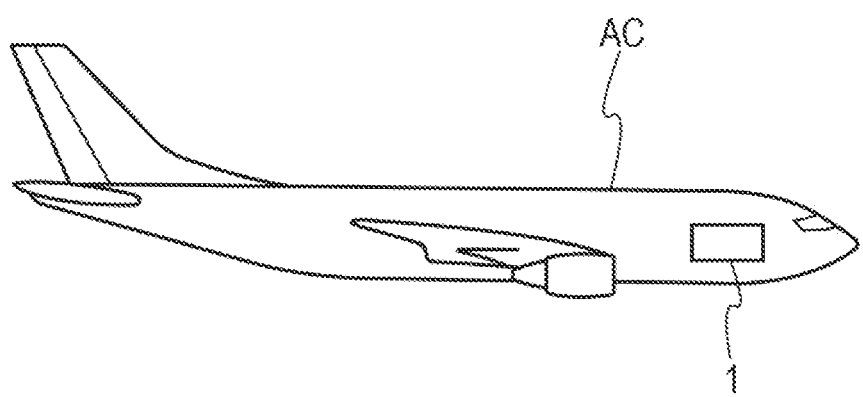
FIG. 4 shows a profile view of an aircraft incorporating the estimation system.

FIG. 1 shows the estimation system 1 for estimating an angular deviation of a reference guidance axis A with respect to an approach axis B towards a runway RWY, and also a position and a velocity of an aircraft AC with respect to the runway RWY during a predefined approach procedure with a view to landing on the runway RWY. The approach axis B corresponds to the approach axis characterizing this predefined approach. The runway RWY has a threshold T (FIGS. 3A and 3B).

In the remainder of the description, the system is called "estimation system 1".

In a first embodiment, the reference guidance axis A under consideration is a lateral guidance axis. The estimation system 1 is configured to estimate the angular deviation $b_{align}$ of the reference lateral guidance axis A with respect to the lateral component of the approach axis B, specifically the longitudinal axis B1 of the runway RWY as illustrated in FIG. 3A. The estimation system 1 is furthermore configured to determine the lateral position $y_{RWY}$ and the lateral velocity of the aircraft AC with respect to the runway, in particular with respect to the threshold T of the runway or with respect to the lateral component of the reference guidance axis A of the runway.

The longitudinal axis B1 of the runway corresponds to an axis splitting the runway RWY into two substantially identical parts in the direction of the length of the runway RWY. The threshold T of the runway RWY corresponds to the origin of an orthonormal reference system $(T, \vec{x}_{RWY}, \vec{y}_{RWY}, \vec{z}_{RWY})$ comprised by the longitudinal axis B1 of the runway RWY.

In a second embodiment, the reference guidance axis A under consideration is a vertical guidance axis. The estimation system 1 is then configured to estimate the angular deviation $b_{GPA}$ of the reference vertical guidance axis A with respect to the vertical component of the approach axis B, specifically a nominal descent trajectory axis B2 corresponding to the predefined approach, as illustrated in FIG. 3B. The estimation system 1 is furthermore configured to determine the vertical position $z_{RWY}$ and the vertical velocity of the aircraft AC with respect to the runway RWY, in particular with respect to the threshold T of the runway or with respect to the vertical component of the reference guidance axis A of the runway.

The approach procedure is performed using a landing assistance device. The landing assistance device may correspond to an ILS system device.

The landing assistance device comprises at least one ground transmitter station 22 configured so as to transmit a reference lateral guidance signal corresponding to a "localizer signal"-type signal, or to transmit a reference vertical guidance signal corresponding to a "glide slope signal"-type signal. The reference lateral guidance signal defines the lateral component of the reference guidance axis A, also called reference lateral axis in the remainder of the description. The reference vertical guidance signal defines the vertical component of the reference guidance axis A, also called reference vertical axis in the remainder of the description.

The approach procedure comprises a capturing phase comprising making the aircraft AC converge towards the reference guidance axis A and a tracking phase comprising guiding the aircraft AC along the reference guidance axis A. In the first embodiment, the reference guidance axis A corresponds to the lateral guidance axis and the approach axis corresponds to the longitudinal axis B1 of the runway RWY. In the second embodiment, the reference guidance axis A corresponds to the vertical guidance axis and the approach axis corresponds to the nominal descent trajectory axis B2.

In practice, the actual reference guidance axis is not perfectly straight, in particular due to multipaths of the guidance signals transmitted by the station 22 caused by the environment. The reference guidance axis A under consideration in the remainder of the invention is straight. It corresponds to an approximation of the actual reference guidance axis, obtained, for example, through averaging, through smoothing or through linear interpolation of the actual reference guidance axis.

The estimation system 1 comprises at least one set of modules implemented iteratively. The set of modules implemented in each iteration comprises:

an offset collection module 2 COLL1 (COLL for "collection module"), a position vector collection module 3 COLL2, a velocity vector collection module 4 COLL3, an information determination module 5 DET (DET for "determination module"), and a storage module 6 MEM (MEM for "memorization module").

The offset collection module 2 is configured so as to collect a lateral offset in the first embodiment (respectively a vertical offset in the second embodiment) measured by an offset measurement module 21 MEAS1 (MEAS for "measurement module") based on the reference lateral (respectively vertical) guidance signal transmitted by the transmitter station 22.

The position vector collection module 3 is configured so as to collect a position vector of the aircraft AC measured by a position vector measurement module 31 MEAS2 based on signals transmitted by a geopositioning system 32. The geopositioning system may correspond to a geolocation and navigation system based on a satellite system GNSS ("Global Navigation Satellite System") such as a GPS ("Global Positioning System") system.

The position vector of the aircraft AC is expressed with respect to the threshold T of the runway RWY. The position vector comprises a longitudinal position, a lateral position and a vertical position.

The velocity vector collection module 4 is configured so as to collect a velocity vector of the aircraft AC measured by a velocity vector inertial measurement module 41 MEAS3. The velocity vector comprises a longitudinal velocity, a lateral velocity and a vertical velocity. The inertial measurement module may correspond to an inertial measurement unit housed on board the aircraft AC.

The information determination module 5 is configured so as to determine information using an estimator filter K 51. This information is determined based on the lateral (respectively vertical) position, the velocity vector, the lateral (respectively vertical) offset determined in the current iteration and at least one lateral (respectively vertical) offset determined and stored in at least one previous iteration.

In the first embodiment, the determined information comprises at least the following:

an estimate of the angular deviation $b_{align}$ of the reference lateral guidance axis A with respect to the longitudinal axis B1 (corresponding to the lateral component of the approach axis B) of the runway RWY, an estimate of the lateral position $y_{RWY}$ of the aircraft AC with respect to the runway RWY and an estimate of the lateral velocity of the aircraft AC with respect to the runway RWY.

The estimates of the lateral position and of the lateral velocity of the aircraft AC with respect to the runway RWY are expressed, for example, in a reference frame R corresponding to the orthonormal reference system $(T, \vec{x}_{RWY}, \vec{y}_{RWY}, \vec{z}_{RWY})$ whose origin is the runway threshold T.

In the second embodiment, the determined information comprises at least the following:

an estimate of the angular deviation $b_{GPA}$ of the reference vertical guidance axis A with respect to the nominal descent trajectory axis B2 (corresponding to the vertical component of the approach axis B), an estimate of the vertical position $z_{RWY}$ of the aircraft AC with respect to the runway RWY and an estimate of the vertical velocity of the aircraft AC with respect to the runway RWY.

The estimates of the vertical position and of the vertical velocity of the aircraft AC with respect to the runway RWY are expressed, for example, in the reference frame R.

Jointly estimating the angular deviation $b_{align}$ (respectively $b_{GPA}$) from the guidance axis A and also the lateral position $y_{RWY}$ (respectively the vertical position $z_{RWY}$) and the lateral velocity (respectively the vertical velocity) of the aircraft using the estimator filter makes it possible to obtain high accuracy for the various estimated values. Specifically, by virtue of this joint estimation, the estimate of one of the values is not impacted by the biases that exist on the other of the values. In particular, the estimate of the position of the aircraft with respect to the runway is thus robust firstly to biases that impact the position vector and secondly to alignment biases of the ILS guidance axis with respect to the approach axis towards the runway (the latter biases being likely to worsen the accuracy of the offsets measured by the offset measurement module). The inventors have determined that the estimate of the position of the aircraft with respect to the runway that is obtained by virtue of this joint estimate is around 100 times more accurate than an estimate of the position of the aircraft performed independently of the estimate of the angular deviation from the guidance axis and of the estimate of the velocity of the aircraft.

The storage module 6 is configured so as to store at least the lateral (respectively vertical) offset, the longitudinal and the lateral (respectively vertical) position that are determined in the current iteration.

In a first variant, the estimation system 1 comprises a diagnostic module 7 DIAG (DIAG for "diagnostic module") and a reconfiguration module 9 REC (REC for "reconfiguration module").

The purpose of the diagnostic module 7 is to detect and to isolate faults pertaining to the position vector measurement module 31 and to the lateral (respectively vertical) guidance signal transmitted by the ground transmitter station 22 and received by the measurement module 21. It thus supplies validity information about each of the measurement modules 21 and 31 to the reconfiguration module 9.

The diagnostic module 7 is configured so as to validate or not validate the lateral offset measurement module 21 and the position vector measurement module 31 based on the information determined by the information determination module 5.

A measurement module 21, 31 is considered to be valid if no fault is detected with the measurement module 21, 31. In the description, the expressions "measurement module 21, 31" or "measurement modules 21, 31" mean "lateral (respectively vertical) offset measurement module 21 and/or position vector measurement module 31".

On the contrary, a measurement module 21, 31 is considered not to be valid if a fault is detected with the measurement module 21, 31.

The velocity vector inertial measurement module 41 is considered to be always valid.

Without limitation, the diagnostic module 7 compares each of the innovation terms determined by the information determination module 5 with a threshold associated with the variable whose innovation term is determined. A fault is detected with the position vector measurement module 31 if the innovation term for the lateral (respectively vertical) position is greater than or equal to the associated threshold for a predetermined successive number of iterations. A fault is detected with the lateral (respectively vertical) offset measurement module 21 if the innovation term for each of the lateral (respectively vertical) offsets is greater than or equal to the associated threshold for a predetermined successive number of iterations. The predetermined successive number of iterations may be different between the position vector measurement module 31 and the lateral (respectively vertical) offset measurement module 21.

Without limitation, a fault with the measurement modules 21, 31 may be detected and isolated by comparing innovation terms with an associated experimentally defined threshold.

In the first embodiment, the associated threshold may also be determined at least based on the covariance matrix ($S_k$) associated with the innovation terms or based on the covariance matrix ($R_k$) of measured noise, the associated threshold being equal to the diagonal term of the covariance matrix ($S_k$) associated with the innovation terms or of the covariance matrix ($R_k$) of measured noise.

In the second embodiment, the associated threshold may also be determined at least based on the covariance matrix (S) associated with the innovation terms using the following relationship:

$$T_{Kalman} = dY S^{-1} dY^T,$$

in which:

$T_{Kalman}$ corresponds to a vector comprising the thresholds associated with the variable whose innovation term is determined in the current iteration, dY corresponds to a vector of innovation terms determined based on the observation vector of the estimator filter 51 in the current iteration, S corresponds to the covariance matrix of the innovation terms in the current iteration.

The vector of innovation terms dY is defined in each iteration according to the following relationship:

$$dY = Y_m - \hat{Y},$$

in which:

$Y_m$ corresponds to a measurement vector used as observation factor for the estimator filter 51, $\hat{Y}$ corresponds to a vector of estimates of the respective measurements of the measurement vector $Y_m$.

The reconfiguration module 9 is configured so as to reconfigure the estimator filter 51 for the current or following iteration in order to eliminate a measurement performed in the following iteration by the one or more measurement modules 21, 31 considered not to be valid.

According to a second variant, the estimation system furthermore comprises a reclassification module 8 REQ (REQ for "requalification module") configured so as to reclassify the one or more measurement modules 21, 31 for which a fault was detected by the diagnostic module 7 implemented in a previous iteration.

The purpose of the reclassification module 8 is to detect the validity of the measurement modules 21, 31 previously considered not to be valid by the diagnostic module 7.

The reclassification module 8 exhibits operation substantially identical to the diagnostic module 7. The reclassification module 8 is thus configured so as to compare each of the innovation terms determined by the information determination module 5 with the predetermined associated threshold. The position vector measurement module 31 is reclassified if the innovation term for the lateral position is less than the associated threshold for a predetermined successive number of iterations. A lateral (respectively vertical) offset measurement module 21 is reclassified if the innovation term for each of the lateral (respectively vertical) offsets is less than the associated threshold for a predetermined successive number of iterations.

A measurement module 21, 31 is reclassified if the measurement module 21, 31 considered not to be valid by the diagnostic module 7 in a previous iteration is considered to be valid by the reclassification module 8 in the current iteration.

The reconfiguration module 9 then reconfigures the estimator filter 51 based on the validity information for the measurement modules 21, 31 determined by the diagnostic module 7 and the reclassification module 8.

According to one preferred embodiment of the first embodiment, the estimator filter 51 is a Kalman filter based on the following state vector:

$$X = \begin{pmatrix} y_{RWY} \\ b_{align} \\ b_{LOC_{sensi}} \\ b_{vy_{IRS}} \\ b_{y_{GNSS}} \\ b_{vx_{IRS}} \end{pmatrix},$$

on the following observation vector:

$$Y = \begin{pmatrix} y_{GNSS} \\ \eta_{LOC} \\ (\eta_{LOC_{mem_i}})_{1 \le i \le N} \end{pmatrix},$$

on the following state equation:

$$\dot{X} = \begin{pmatrix} \sqrt{(vx_{IRS} - b_{vxIRS})^2 + (vy_{IRS} - b_{vyIRS})^2 + vz_{IRS}^2} \sin\left(QFU - \arctan\left(\frac{vy_{IRS} + b_{vyIRS}}{vx_{IRS} + b_{vxIRS}}\right)\right) + b_{vyIRS} \\ 0 \\ 0 \\ 0 \\ 0 \\ 0 \end{pmatrix},$$

and on the following observation equation:

$$Y = \begin{pmatrix} y_{RWY} - b_{y_{GNSS}} \\ \dfrac{L}{(0.7 - b_{LOC_{sensi}})(L - x_{RWY})}[y_{RWY} - d_{offset} - (L - x_{RWY})\sin(b_{align})] \\ \left(\dfrac{L}{(0.7 - b_{LOC_{sensi}})(L - x_{mem_i})}[y_{mem_i} - b_{y_{GNSS}} - d_{offset} - (L - x_{RWY_{mem_i}})\sin(b_{align})]\right)_{1 \le i \le N} \end{pmatrix},$$

These relationships use the following variables:

$x_{RWY}$ corresponds to a longitudinal position of the aircraft AC with respect to the threshold T of the runway RWY (in meters), in the reference frame R, $y_{RWY}$ corresponds to a lateral position of the aircraft AC with respect to the threshold T of the runway RWY (in meters), in the reference frame R, $b_{align}$ corresponds to an angular deviation of the reference lateral guidance axis A with respect to the longitudinal axis B1 of the runway RWY (in radians), $b_{LOC_{sensi}}$ corresponds to a sensitivity factor, $vx_{IRS}$ corresponds to the longitudinal velocity of the aircraft AC collected by the velocity vector collection module 4 (in meters per second), $vy_{IRS}$ corresponds to the lateral velocity of the aircraft AC collected by the velocity vector collection module 4 (in meters per second), $vz_{IRS}$ corresponds to the vertical velocity of the aircraft AC collected by the velocity vector collection module 4 (in meters per second), $b_{vx_{IRS}}$ corresponds to a bias of the longitudinal velocity of the aircraft AC collected by the velocity vector collection module 4 (in meters per second), $b_{vy_{IRS}}$ corresponds to a bias of the lateral velocity of the aircraft AC collected by the velocity vector collection module 4 (in meters per second), $b_{y_{GNSS}}$ corresponds to a bias of the lateral position of the aircraft AC measured by the position vector measurement module 31 (in meters), $y_{GNSS}$ corresponds to the lateral position of the aircraft collected by the position vector collection module 3 (in meters), $\eta_{LOC}$ corresponds to the lateral offset measured by the offset measurement module 21 in microamperes and collected by the offset collection module 2, $$\left(\eta_{LOC_{mem_i}}\right)_{1 \le i \le N}$$

corresponds to a vector comprising at least one lateral offset $\eta_{LOC_{mem_i}}$ measured in microamperes, stored and collected in the lateral offset collection step E1 in an iteration i prior to the current iteration, N corresponding to a predetermined number of lateral offsets measured and stored in iterations prior to the current iteration, $x_{mem_i}$ and $y_{mem_i}$ correspond respectively to a longitudinal position and a lateral position of the aircraft AC (in meters) with respect to the threshold T of the runway (RWY) in the reference frame R, stored and collected in the lateral offset collection step E1 in an iteration i prior to the current iteration, in the same iteration as the lateral offset $\eta_{LOC_{mem_i}}$, L corresponds to a distance (in meters) between the threshold T of the runway RWY and an orthogonal projection of the position of the transmitter station 22 onto the longitudinal axis B1 of the runway RWY, $d_{offset}$ corresponds to a distance (in meters) between the position of the transmitter station 22 and the longitudinal axis B1 of the runway RWY, QFU corresponds to a geometric orientation of the runway RWY (in radians).

The sensitivity factor bias $b_{LOC_{sensi}}$ corresponds to an offset in the observed sensitivity with respect to the factor predetermined at 0.7 (by the ICAO).

Moreover, the information determined by the information determination module 5 furthermore comprises:
  estimates of the following variables:
    the longitudinal position $x_{RWY}$ of the aircraft AC with respect to the threshold T of the runway RWY in the reference frame R,
    the angular deviation $b_{align}$ of the reference lateral guidance axis A with respect to the longitudinal axis B1 of the runway RWY,
    the bias $b_{LOC_{sensi}}$ pertaining to the sensitivity factor, which is standardized at 0.7,
    the bias of the lateral velocity $b_{vy_{IRS}}$ of the aircraft AC,
    the bias of the lateral position $b_{y_{GNSS}}$ of the aircraft AC measured by the position vector measurement module 31,
    the bias of the longitudinal velocity $b_{vx_{IRS}}$ of the aircraft AC,
  innovation terms for the following variables:
    the lateral position of the aircraft collected in the position vector collection step E2,
    the lateral offset collected in the lateral offset collection step E1,
    a vector comprising at least one lateral offset, stored and collected in the lateral offset collection step E1 in an iteration prior to the current iteration;
  an estimate error covariance matrix;
  a covariance matrix $S_k$ associated with the innovation terms.

The lateral offset may be measured in radians or in microamperes with respect to the reference lateral guidance axis A.

It may also be measured as a difference in depth of modulation DDM. In practice, it is expressed as a percentage or in microamperes. The lateral guidance signal contains two parts. Each of the parts is transmitted at a different frequency from one another. The DDM corresponds to a difference between the depth of modulation of one part transmitted at one frequency and the depth of modulation of the other part transmitted at another frequency.

The lateral offset in radians is linked to the lateral offset in DDM by a factor defined by the ICAO.

The lateral offset in radians, in microamperes or in DDM is zero when the aircraft is following a trajectory aligned with the reference lateral guidance axis A.

According to one preferred embodiment of the second embodiment, the estimator filter 51 is a Kalman filter based on the following state vector:

$$X = \begin{pmatrix} z_{RWY} \\ b_{GPA} \\ b_{GS_{sensi}} \\ b_{z_{GNSS}} \\ b_{vz_{IRS}} \end{pmatrix},$$

on the following observation vector:

$$Y = \begin{pmatrix} z_{GNSS} \\ \eta_{GS_{ddm}} \\ \left(\eta_{GS_{ddm_{mem_i}}}\right)_{1 \leq i \leq N} \end{pmatrix},$$

on the following state equation:

$$\dot{X} = \begin{pmatrix} vz_{IRS} - b_{vz_{IRS}} \\ 0 \\ 0 \\ 0 \\ 0 \\ 0 \end{pmatrix},$$

and on the following observation equation:

$$Y = \begin{pmatrix} z_{RWY} - b_{z_{GNSS}} \\ \text{sgn}(\eta_{GS_{rad}}) f(\eta_{GS_{rad}}, b_{GS_{sensi}}, b_{GPA}) \\ \left(\text{sgn}(\eta_{GS_{rad}}) f\left(\eta_{GS_{rad_{mem_i}}}, b_{GS_{sensi}}, b_{GPA}\right)\right)_{1 \leq i \leq N} \end{pmatrix},$$

where:

$$\begin{pmatrix} \eta_{GS_{rad}} \\ \eta_{GS_{rad_{mem_i}}} \end{pmatrix} = \begin{pmatrix} GPA - b_{GPA} - \arctan\left[\dfrac{(vz_{IRS} - b_{vz_{IRS}})dt + z_{RWY}}{x_{RWY} + \dfrac{TCH}{\tan(GPA - b_{GPA})}}\right] \\ GPA - b_{GPA} - \arctan\left[\dfrac{z_{mem_i} - b_{z_{GNSS}}}{x_{mem_i} + \dfrac{TCH}{\tan(GPA - b_{GPA})}}\right] \end{pmatrix},$$

The term $$f(\eta_{GS_{rad}}, b_{GS_{sensi}}, b_{GPA}) \text{ and } f\left(\eta_{GS_{rad_{mem_i}}}, b_{GS_{sensi}}, b_{GPA}\right)$$

is expressed according to one or the other of the following relationships.

Or it is expressed by the following relationship:

$$f(\eta_{GS_{rad}}, b_{GS_{sensi}}, b_{GPA}) = \frac{0.0875 \eta_{GS_{rad}}}{(0.12 - b_{GS_{sensi}})(GPA - b_{GPA})}$$

and $$f\left(\eta_{GS_{rad_{mem_i}}}, b_{GS_{sensi}}, b_{GPA}\right) = \frac{0,0875 \eta_{GS_{rad_{mem_i}}}}{(0.12 - b_{GS_{sensi}})(GPA - b_{GPA})}.$$

Or it is expressed by the following relationship:

If $|\eta_{GS_{dmm}}| \leq 0.0875$ and $\left|\eta_{GS_{dmm_{mem_i}}}\right| \leq 0.0875$, then $$f(\eta_{GS_{rad}}, b_{GS_{sensi}}, b_{GPA}) = \frac{0.0875 \eta_{GS_{rad}}}{(0.12 - b_{GS_{sensi}})(GPA - b_{GPA})} \text{ and}$$

$$f\left(\eta_{GS_{rad_{mem_i}}}, b_{GS_{sensi}}, b_{GPA}\right) = \frac{0.0875 \eta_{GS_{rad_{mem_i}}}}{(0.12 - b_{GS_{sensi}})(GPA - b_{GPA})},$$

Othewrise:

$$f(\eta_{GS_{rad}}, b_{GS_{sensi}}, b_{GPA}) =$$

$$0.0875 + \frac{(0.22 - 0.0875)(|\eta_{GS_{rad}}| - 0.12 + b_{GS_{sensi}})}{1 - 0.12 + b_{GS_{sensi}} - 0.5(0.3 + 0.45)} \text{ and}$$

$$f\left(\eta_{GS_{rad_{mem_i}}}, b_{GS_{sensi}}, b_{GPA}\right) =$$

$$0.0875 + \frac{(0.22 - 0.0875)\left(\left|\eta_{GS_{rad_{mem_i}}}\right| - 0.12 + b_{GS_{sensi}}\right)}{1 - 0.12 + b_{GS_{sensi}} - 0.5(0.3 + 0.45)}.$$

These relationships use the following variables:

$z_{RWY}$ corresponds to a vertical position of the aircraft AC with respect to the threshold T of the runway RWY (in meters) in the reference frame R, GPA corresponds to an angle of the nominal descent trajectory axis B2 with respect to the runway RWY (in radians), $b_{GPA}$ corresponds to an angular deviation of the reference vertical guidance axis A with respect to a nominal descent trajectory axis B2 (in radians), $b_{GS_{sensi}}$ corresponds to a bias pertaining to the reference sensitivity factor, defined at 0.12 by the ICAO, $b_{z_{GNSS}}$ corresponds to a bias of the vertical position of the aircraft AC collected by the position vector collection module 3 (in meters), $z_{GNSS}$ corresponds to the vertical position collected by the position vector collection module 3 (in meters), $\eta_{GS_{ddm}}$ corresponds to the vertical offset measured in DDM by the offset measurement module 21 and collected by the offset collection module 2, $\eta_{GS_{rad}}$ corresponds to the vertical offset measured in radians by the offset measurement module 21 and collected by the offset collection module 2, $$\left(\eta_{GS_{ddm_{mem_i}}}\right)_{1 \leq i \leq N}$$

corresponds to a vector comprising at least one vertical offset $\eta_{GS_{ddm_{mem_i}}}$ measured in DDM, stored and collected by the offset collection module 2 in an iteration i prior to the current iteration, N corresponding to a predetermined number of vertical offsets measured and stored in iterations prior to the current iteration, $$\left(\eta_{GS_{rad_{mem_i}}}\right)_{1\leq i\leq N}$$

corresponds to a vector comprising at least one vertical offset $$\eta_{GS_{rad_{mem_i}}}$$

measured in radians, stored and collected by the offset collection module 2 in an iteration i prior to the current iteration, N corresponding to a predetermined number of vertical offsets measured and stored in iterations prior to the current iteration, $vz_{IRS}$ corresponds to the vertical velocity of the aircraft AC collected by the velocity vector collection module 4 (in meters per second), $b_{vz_{IRS}}$ corresponds to a bias of the vertical velocity of the aircraft AC collected by the velocity vector collection module 4 (in meters per second), dt corresponds to a time between two iterations (in seconds), QFU corresponds to a geometric orientation of the runway RWY (in radians), TCH corresponds to an altitude with respect to the threshold T of the runway RWY at which the vertical offset is zero (in meters), $x_{RWY}$ corresponds to a longitudinal distance between the aircraft AC and the threshold T of the runway RWY (in meters), collected by the position vector collection module 3, $x_{mem_i}$ corresponds to the longitudinal position collected by the position vector collection module 3 (in meters) and stored in an iteration prior to the current iteration in the same iteration as the vertical offset $$\eta_{GS_{ddm_{mem_i}}},$$

$z_{mem_i}$ corresponds to the vertical position collected by the position vector collection module 3 (in meters) and stored in an iteration prior to the current
iteration in the same iteration as the vertical offset $$\eta_{GS_{ddm_{mem_i}}},$$

$$sgn(x) = \begin{cases} -1 & \text{if } x < 0 \\ 0 & \text{if } x = 0 \\ 1 & \text{if } x > 0 \end{cases}$$

The sensitivity factor $b_{GS_{sensi}}$ corresponds to a predetermined factor (predetermined by the ICAO).

In the case of a vertical jump in the measurement by the vertical offset measurement module 21 by a value ΔGNSS following a change in constellation, the vertical offset measurement $$\eta_{GS_{ddm_{mem_i}}}$$

may be updated if the observed jump takes place after it has been stored, using the following relationship:

$$\eta_{GS_{ddm_{mem_i}}} = GPA - b_{GPA} - \arctan\left[\frac{z_{mem_i} - b_{z_{GNSS}} + \Delta GNSS - H_{RWY}}{x_{mem_i} + \frac{TCH}{\tan(GPA - b_{GPA})}}\right].$$

Moreover, the information determined by the information determination module 5 furthermore comprises:
estimates of the following variables:
the vertical position $z_{RWY}$ of the aircraft AC with respect to the threshold T of the runway RWY in the reference frame R,
the vertical offset $\eta_{GS_{ddm}}$ in DDM of the aircraft AC,
the sensitivity factor bias $b_{GSS_{sensi}}$,
the bias of the vertical position $b_{z_{GNSS}}$ of the aircraft AC,
the bias of the vertical velocity $b_{vz_{IRS}}$ of the aircraft AC;
innovation terms for the following variables:
the vertical position of the aircraft collected by the position vector collection module 3,
the vertical offset measured in DDM collected by the vertical offset collection module 2,
a vector comprising at least one vertical offset measured in DDM, stored and collected by the vertical offset collection module 2 in an iteration prior to the current iteration;
an estimate error covariance matrix;
a covariance matrix S associated with the innovation terms.

The vertical offset may be measured in radians with respect to the reference vertical guidance axis A.

It may also be measured as a difference in depth of modulation DDM. In practice, it is expressed as a percentage or in microamperes. The vertical guidance signal contains two parts. Each of the parts is transmitted at a different frequency from one another. The DDM corresponds to a difference between the depth of modulation of one part transmitted at one frequency and the depth of modulation of the other part transmitted at another frequency.

The lateral offset in radians is linked to the lateral offset in DDM by a factor defined by the ICAO.

The vertical offset in radians or in DDM is zero when the aircraft is following a trajectory aligned with the reference vertical guidance axis A.

According to one embodiment, the reconfiguration module 9 may comprise a validity submodule 91 VAL (VAL for "validation submodule"), a storage submodule 92 SMEM (SMEM for "memorization submodule"), an observability submodule 93 OBS (OBS for "observability submodule") and an adaptation submodule 94 ADAP (ADAP for "adaptation submodule").

The validity submodule 91 is configured so as to synthesize the validity of the lateral offset measurement module 21 and of the position vector measurement module 31 on the basis of the validity determined by the diagnostic module 7 and the reclassification module 8.

The storage submodule 92 is configured so as to manage the storage implemented by the storage module 6 by asking the storage module 6 to store:

- the lateral (respectively vertical) offset, the longitudinal position and the lateral (respectively vertical) position at the start of the capturing phase when the lateral (respectively vertical) offset complies with predetermined validity features,
- the lateral (respectively vertical) offset, the longitudinal position and the lateral (respectively vertical) position at the start of the tracking phase.

This lateral (respectively vertical) offset information, longitudinal position information and lateral (respectively vertical) position information may also be stored at other times of the approach.

The predetermined validity features may be defined by the ICAO.

The observability submodule 93 is configured so as to formulate a strategy for setting certain states on the basis of the phase of the approach:

- by setting the bias of the lateral position of the aircraft AC to zero in the capturing phase,
- by setting the sensitivity factor bias to its last value or to its average in the tracking phase,
- by interpolating the bias of the lateral (respectively vertical) position of the aircraft AC, following a predetermined number of iterations after which the bias began to be estimated, using one of the two following relationships:

In the first embodiment, the bias of the lateral position of the aircraft AC is interpolated using the following relationship:

$$b_{y_{GNSS}} = \hat{b}_{y_{GNSS}} \frac{L_{GS} + x_{bGNSS_{OK}}}{x_{RWY} + x_{bGNSS_{OK}}},$$

in which:

$x_{bGNSS_{OK}}$ corresponds to a longitudinal distance from which the estimation of the bias of the lateral position of the aircraft (AC) began.

A sliding average may also be determined in order to fine-tune the estimate of the bias of the lateral position $\hat{b}_{y_{GNSS}}$ throughout the entire approach procedure.

In the second embodiment, the bias of the vertical position of the aircraft AC is interpolated using the following relationship:

$$b_{z_{GNSS}} = \hat{b}_{z_{GNSS}} \frac{L_{GS} + x_{bGNSS_{OK}}}{x_{RWY} + x_{bGNSS_{OK}}},$$

in which:

$x_{bGNSS_{OK}}$ corresponds to a longitudinal distance from which the estimation of the bias of the vertical position of the aircraft (AC) began, $L_{GS}$ corresponds to a longitudinal distance between the transmitter station (22) and the threshold (T) of the runway (RWY).

The distance $L_{GS}$ is governed by the following relationship:

$$L_{GS} = \frac{TCH}{\tan(GPA - \hat{b}_{GPA})}.$$

The adaptation submodule 94 is configured so as to adapt covariance matrices associated with the Kalman filter 51 on the basis of the validities synthesized by the validity submodule 91 and of the setting strategy formulated by the observability submodule 93.

Figure 2:
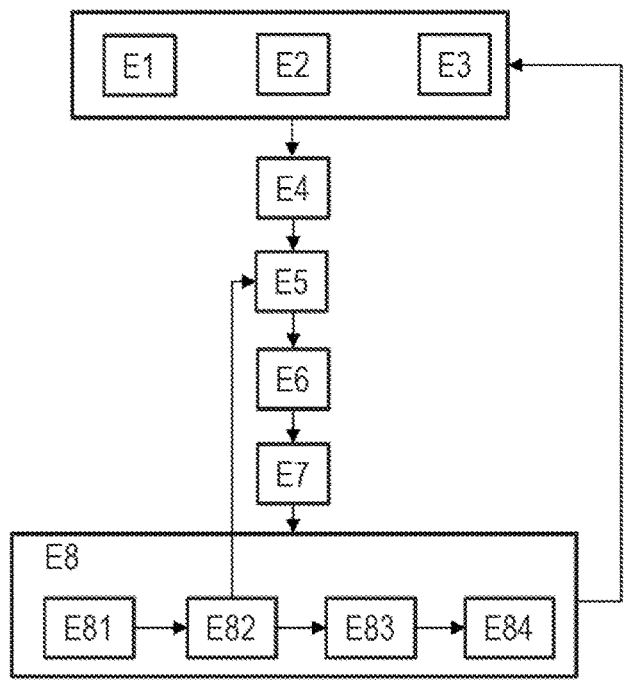
FIG. 2 shows a schematic view of the estimation method.

The invention also relates to an estimation method (FIG. 2).

The estimation method comprises at least one set of steps implemented iteratively, the set of steps implemented in each iteration comprising:

- a lateral (respectively vertical) offset collection step E1, implemented by the offset collection module 2, comprising collecting a lateral (respectively vertical) offset measured by the offset measurement module 21 based on the reference lateral (respectively vertical) guidance signal transmitted by the transmitter station 22;
- a position vector collection step E2, implemented by the position vector collection module 3, comprising collecting a position vector of the aircraft AC measured by the position vector measurement module 31 based on signals transmitted by the geopositioning system 32;
- a velocity vector collection step E3, implemented by the velocity vector collection module 4, comprising collecting a velocity vector of the aircraft AC measured by the velocity vector inertial measurement module 41;
- an information determination step E4, implemented by the information determination module 5, comprising determining at least the following information, using the estimator filter 51, based on the lateral (respectively vertical) position, based on the velocity vector, based on the lateral (respectively vertical) offset determined in the current iteration and based at least on a lateral (respectively vertical) offset determined and stored in at least one previous iteration:
  - an estimate of the angular deviation $b_{align}$ (respectively $b_{GPA}$) of the reference lateral (respectively vertical) guidance axis A with respect to the longitudinal axis B1 of the runway RWY (respectively with respect to the nominal descent trajectory axis B2),
  - an estimate of the lateral position $y_{RWY}$ (respectively vertical position $z_{RWY}$) of the aircraft AC with respect to the runway RWY; and
  - an estimate of the lateral (respectively vertical) velocity of the aircraft AC with respect to the runway RWY;
- a storage step E5, implemented by the storage module 6, comprising storing at least the lateral (respectively vertical) offset, the longitudinal position and the lateral (respectively vertical) position that are determined in the current iteration.

According to the first variant, the estimation method furthermore comprises:

- a diagnostic step E6, implemented by the diagnostic module 7, comprising validating or not validating the offset measurement module 21 and the position vector measurement module 31 based on the information determined in the information determination step E4;
- a reconfiguration step E8, implemented by the reconfiguration module 9, comprising reconfiguring the estimator filter 51 for the current or following iteration in order to eliminate a measurement performed in the current or following iteration by the one or more measurement modules 21, 31 considered not to be valid.

According to the second variant, the estimation method also comprises a reclassification step E7, implemented by the reclassification module 8, comprising reclassifying the one or more measurement modules 21, 31 for which a fault was detected in the diagnostic step E6 implemented in a previous iteration. The reclassification step E7 precedes the reconfiguration step E8.

The diagnostic step E6 comprises comparing each of the innovation terms determined in the information determination step E4 with a threshold associated with the variable whose innovation term is determined.

The reclassification step E7 comprises comparing each of the innovation terms determined in the information determination step E4 with the predetermined associated threshold.

The reconfiguration step E8 comprises the following sub-steps:
- a validity sub-step E81, implemented by the validity submodule 91, comprising synthesizing the validity of the offset measurement module 21 and of the position vector measurement module 31;
- a storage sub-step E82, implemented by a storage submodule 92, comprising managing the storage implemented in the storage step E5 by storing:
  - the lateral (respectively vertical) offset, the longitudinal position and the lateral (respectively vertical) position at the start of the capturing phase when the lateral (respectively vertical) offset complies with predetermined validity features,
  - the lateral (respectively vertical) offset, the longitudinal position and the lateral (respectively vertical) position at the start of the tracking phase;
- an observability sub-step E83, implemented by an observability submodule 93, comprising formulating a strategy for setting certain states on the basis of the phase of the approach:
  - by setting the bias of the lateral (respectively vertical) position of the aircraft AC to zero in the capturing phase,
  - by setting the sensitivity factor bias to its last value or to its average in the tracking phase,
  - by interpolating the bias of the lateral (respectively vertical) position of the aircraft AC following a predetermined number of iterations after which the bias began to be estimated during the tracking phase;
- an adaptation sub-step E84, implemented by the adaptation submodule 94, comprising adapting covariance matrices associated with the Kalman filter 51 on the basis of the validities synthesized in the validity sub-step E81 and of the setting strategy formulated in the observability step E83.

The estimation system and the estimation method make it possible to obtain an estimate of the lateral (respectively vertical) position and of the lateral (respectably vertical) velocity of the aircraft AC with respect to the runway threshold T in the reference frame R or with respect to the reference approach axis A, and also an estimate of the features of the lateral (respectively vertical) guidance signal throughout the entire approach procedure. More particularly, they make it possible to fine-tune the estimate of the features of the lateral (respectively vertical) guidance signal without being impacted by a lateral (respectively vertical) position bias in the last nautical miles (1 nautical mile being substantially equal to 1852 m) before reaching the threshold T of the runway RWY.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for estimating, during an approach procedure of an aircraft with a view to landing on a runway in accordance with a predefined approach towards said runway, an angular deviation of a reference guidance axis with respect to an approach axis corresponding to said predefined approach towards the runway, and also a position and a velocity of the aircraft with respect to the runway, the approach procedure being performed using a landing assistance device, the landing assistance device comprising at least one transmitter station configured to transmit a reference guidance signal defining the reference guidance axis, the runway having a threshold, the approach procedure comprising a capturing phase comprising making the aircraft converge towards the reference guidance axis and a tracking phase comprising guiding the aircraft along the reference guidance axis, the method comprising at least one set of steps implemented iteratively, the set of steps implemented in each iteration comprising:

an offset collection step, implemented by an offset collection module, comprising collecting an offset measured by an offset measurement module based on the reference guidance signal transmitted by the transmitter station;

a position vector collection step, implemented by a position vector collection module, comprising collecting a position vector of the aircraft measured by a position vector measurement module based on signals transmitted by a geopositioning system, the position vector of the aircraft being expressed with respect to the threshold of the runway, the position vector comprising a longitudinal position, a lateral position and a vertical position;

a velocity vector collection step, implemented by a velocity vector collection module, comprising collecting a velocity vector of the aircraft measured by a velocity vector inertial measurement module, the velocity vector comprising a longitudinal velocity, a lateral velocity and a vertical velocity;

an information determination step, implemented by an information determination module, comprising determining at least the following information, using an estimator filter, based on the position vector, based on the velocity vector, based on the offset determined in a current iteration and based at least on an offset determined and stored in at least one previous iteration:

an estimate of the angular deviation of the reference guidance axis with respect to the approach axis towards the runway, an estimate of the position of the aircraft with respect to the runway and an estimate of the velocity of the aircraft with respect to the runway;

a storage step, implemented by a storage module, comprising storing at least the offset and the position vector that are determined in the current iteration.

2. The method according to claim 1, further comprising:
a diagnostic step, implemented by a diagnostic module, comprising validating or not validating the offset measurement module and the position vector measurement module based on the information determined in the information determination step, a measurement module being considered to be valid if no fault is detected with said measurement module, a measurement module being considered not to be valid if a fault is detected with said measurement module, the velocity vector inertial measurement module being considered to be always valid; and a reconfiguration step, implemented by a reconfiguration module, comprising reconfiguring the estimator filter for a following iteration in order to eliminate a measurement performed by the one or more measurement modules considered not to be valid.

3. The method according to claim 2, further comprising:
a reclassification step, implemented by a reclassification module, comprising reclassifying the one or more measurement modules for which a fault was detected in the diagnostic step implemented in a previous iteration, the reclassification step preceding the reconfiguration step.

4. The method according to claim 2, wherein with the estimator filter being a Kalman filter, the reconfiguration step comprises the following sub-steps:

a validity sub-step, implemented by a validity submodule, comprising synthesizing a validity of the offset measurement module, of the position vector measurement module and of the velocity vector inertial measurement module;

a storage sub-step, implemented by a storage submodule, comprising managing a storage implemented in the storage step by storing:

the offset and the position at the start of the capturing phase when the offset complies with predetermined validity features, the offset and the position at a start of the tracking phase;

an observability sub-step, implemented by an observability submodule, comprising formulating a strategy for setting certain states based on the phase of the approach:

by setting a bias of the position of the aircraft to zero in the capturing phase, by setting the sensitivity factor bias to its last value or to its average in the tracking phase, by interpolating the bias of the position of the aircraft, following a predetermined number of iterations after which said bias began to be estimated;

an adaptation sub-step, implemented by an adaptation submodule, comprising adapting covariance matrices associated with the Kalman filter based on the validities synthesized in the validity sub-step and of the setting strategy formulated in the observability step.

5. The method according to claim 1,
wherein the offset is a lateral offset and the estimator filter is a Kalman filter based on the following state vector:

$$X = \begin{pmatrix} y_{RWY} \\ b_{align} \\ b_{LOC_{sensi}} \\ b_{vy_{IRS}} \\ b_{y_{GNSS}} \\ b_{vx_{IRS}} \end{pmatrix},$$

on the following observation vector:

$$Y = \begin{pmatrix} y_{GNSS} \\ \eta_{LOC} \\ (\eta_{LOC_{mem_i}})_{1 \leq i \leq N} \end{pmatrix},$$

on the following state equation:

$$\dot{X} = \begin{pmatrix} \sqrt{(vx_{IRS} - b_{vxIRS})^2 + (vy_{IRS} - b_{vyIRS})^2 + vz_{IRS}^2} \sin\left(QFU - \arctan\left(\frac{vy_{IRS} + b_{vyIRS}}{vx_{IRS} + b_{vxIRS}}\right)\right) - b_{vyIRS} \\ 0 \\ 0 \\ 0 \\ 0 \\ 0 \end{pmatrix}$$

and on the following observation equation:

$$Y = \begin{pmatrix} y_{RWY} - b_{y_{GNSS}} \\ \frac{L}{(0.7 - b_{LOC_{sensi}})(L - x_{RWY})}[y_{RWY} - d_{offset} - (L - x_{RWY})\sin(b_{align})] \\ \frac{L}{(0.7 - b_{LOC_{sensi}})(L - x_{mem_i})}[y_{mem_i} - b_{y_{GNSS}} - d_{offset} - (L - x_{RWY_{mem_i}})\sin(b_{align})]_{1 \leq i \leq N} \end{pmatrix}$$

in which:
- $x_{RWY}$ corresponds to a longitudinal position of the aircraft with respect to the threshold of the runway,
- $y_{RWY}$ corresponds to a lateral position of the aircraft with respect to the threshold of the runway,
- $b_{align}$ corresponds to an angular deviation of the reference lateral guidance axis with respect to the longitudinal axis of the runway,
- $b_{LOC_{sensi}}$ corresponds to a sensitivity factor bias of the reference lateral guidance signal with respect to the standardized sensitivity factor of 0.7,
- $vx_{IRS}$ corresponds to the longitudinal velocity of the aircraft collected by the velocity vector collection module,
- $vy_{IRS}$ corresponds to the lateral velocity of the aircraft collected by the velocity vector collection module,
- $vz_{IRS}$ corresponds to the vertical velocity of the aircraft collected by the velocity vector collection module,
- $b_{vx_{IRS}}$ corresponds to a bias of the longitudinal velocity of the aircraft collected by the velocity vector collection module,
- $b_{vy_{IRS}}$ corresponds to a bias of the lateral velocity of the aircraft collected by the velocity vector collection module,
- $b_{y_{GNSS}}$ corresponds to a bias of the lateral position of the aircraft measured by the position vector measurement module,
- $y_{GNSS}$ corresponds to the lateral position collected by the position vector collection module,
- $\eta_{LOC}$ corresponds to the lateral offset measured by the offset measurement module (21) in microamperes and collected by the offset collection module, $$(\eta_{LOC_{mem_i}})_{1 \leq i \leq N}$$

corresponds to a vector comprising at least one lateral offset $$\eta_{LOC_{mem_i}}$$

measured in microamperes, stored and collected in the lateral offset collection step in an iteration i prior to the current iteration, N corresponding to a predetermined number of lateral offsets measured and stored in iterations prior to the current iteration, $x_{mem_i}$ and $y_{mem_i}$ correspond respectively to a longitudinal position and a lateral position of the aircraft with respect to the threshold of the runway, stored and collected in the lateral offset collection step prior to the current iteration and in the same iteration as the lateral offset $$\eta_{LOC_{mem_i}},$$

L corresponds to a distance between the threshold of the runway and an orthogonal projection of the position of the transmitter station onto the longitudinal axis of the runway, $d_{offset}$ corresponds to a distance between the position of the transmitter station and the longitudinal axis of the runway, QFU corresponds to a geometric orientation of the runway.

6. The method according to claim 5, wherein the information determined in the information determination step furthermore comprises:
   estimates of the following variables:
   the longitudinal position of the aircraft with respect to the threshold of the runway,
   the angular deviation of the reference lateral guidance axis with respect to the longitudinal axis of the runway,
   the bias pertaining to the sensitivity factor,
   the bias of the lateral velocity of the aircraft,
   the bias of the lateral position of the aircraft measured by the position vector measurement module,
   the bias of the longitudinal velocity of the aircraft, innovation terms for the following variables:
   the lateral position of the aircraft collected in the position vector collection step,
   the lateral offset collected in the lateral offset collection step,
   a vector comprising at least one lateral offset, stored and collected in the lateral offset collection step in an iteration prior to the current iteration;
an estimate error covariance matrix;
a covariance matrix associated with the innovation terms.

7. The method according to claim 1,
wherein the offset is a vertical offset and the estimator filter is a Kalman filter based on the following state vector:

$$X = \begin{pmatrix} z_{RWY} \\ b_{GPA} \\ b_{GS_{sensi}} \\ b_{z_{GNSS}} \\ b_{vz_{IRS}} \end{pmatrix},$$

on the following observation vector:

$$Y = \begin{pmatrix} z_{GNSS} \\ \eta_{GS_{ddm}} \\ \left(\eta_{GS_{ddm_{mem_i}}}\right)_{1 \le i \le N} \end{pmatrix},$$

on the following state equation:

$$\dot{X} = \begin{pmatrix} vz_{IRS} - b_{vz_{IRS}} \\ 0 \\ 0 \\ 0 \\ 0 \\ 0 \end{pmatrix},$$

and on the following observation equation:

$$Y = \begin{pmatrix} z_{RWY} - b_{z_{GNSS}} \\ sgn(\eta_{GS_{rad}}) f(\eta_{GS_{rad}}, b_{GS_{sensi}}, b_{GPA}) \\ \left(sgn(\eta_{GS_{rad}}) f\left(\eta_{GS_{rad_{mem_i}}}, b_{GS_{sensi}}, b_{GPA}\right)\right)_{1 \le i \le N} \end{pmatrix},$$

where:

$$\begin{pmatrix} \eta_{GS_{rad}} \\ \eta_{GS_{rad_{mem_i}}} \end{pmatrix} = \begin{pmatrix} GPA - b_{GPA} - \arctan\left[\dfrac{(vz_{IRS} - b_{vz_{IRS}})dt + z_{RWY}}{x_{RWY} + \dfrac{TCH}{\tan(GPA - b_{GPA})}}\right] \\ GPA - b_{GPA} - \arctan\left[\dfrac{z_{mem_i} - b_{z_{GNSS}} - H_{RWY}}{x_{mem_i} + \dfrac{TCH}{\tan(GPA - b_{GPA})}}\right] \end{pmatrix},$$

where $f(\eta_{GS_{rad}}, b_{GS_{sensi}}, b_{GPA})$ and $f\left(\eta_{GS_{rad_{mem_i}}}, b_{GS_{sensi}}, b_{GPA}\right)$ are expressed according to the relationship:
or $$f(\eta_{GS_{rad}}, b_{GS_{sensi}}, b_{GPA}) = \frac{0.0875 \eta_{GS_{rad}}}{(0.12 - b_{GS_{sensi}})(GPA - b_{GPA})} \text{ and}$$

$$f\left(\eta_{GS_{rad_{mem_i}}}, b_{GS_{sensi}}, b_{GPA}\right) = \frac{0.0875 \eta_{GS_{rad_{mem_i}}}}{(0.12 - b_{GS_{sensi}})(GPA - b_{GPA})},$$

or if $|\eta_{GS_{ddm}}| \le 0.0875$ and $\left|\eta_{GS_{ddm_{mem_i}}}\right| \le 0.0875$, $$f(\eta_{GS_{rad}}, b_{GS_{sensi}}, b_{GPA}) = \frac{0.0875 \eta_{GS_{rad}}}{(0.12 - b_{GS_{sensi}})(GPA - b_{GPA})} \text{ and}$$

$$f\left(\eta_{GS_{rad_{mem_i}}}, b_{GS_{sensi}}, b_{GPA}\right) = \frac{0.0875 \eta_{GS_{rad_{mem_i}}}}{(0.12 - b_{GS_{sensi}})(GPA - b_{GPA})},$$

otherwise $$f(\eta_{GS_{rad}}, b_{GS_{sensi}}, b_{GPA}) =$$
$$0.0875 + \frac{(0.22 - 0.0875)(|\eta_{GS_{rad}}| - 0.12 + b_{GS_{sensi}})}{1 - 0.12 + b_{GS_{sensi}} - 0.5(0.3 + 0.45)} \text{ and}$$

$$f\left(\eta_{GS_{rad_{mem_i}}}, b_{GS_{sensi}}, b_{GPA}\right) =$$
$$0.0875 + \frac{(0.22 - 0.0875)\left(\left|\eta_{GS_{rad_{mem_i}}}\right| - 0.12 + b_{GS_{sensi}}\right)}{1 - 0.12 + b_{GS_{sensi}} - 0.5(0.3 + 0.45)};$$

in which:
   $z_{RWY}$ corresponds to a vertical position of the aircraft with respect to the threshold of the runway,
   GPA corresponds to an angle of the nominal descent trajectory axis with respect to the runway,
   $b_{GPA}$ corresponds to an angular deviation of the reference vertical guidance axis with respect to a nominal descent trajectory axis,
   $b_{GS_{sensi}}$ corresponds to a bias pertaining to the reference sensitivity factor, defined at 0.12 by the ICAO,
   $b_{z_{GNSS}}$ corresponds to a bias of the vertical position of the aircraft collected by the position vector collection module,
   $z_{GNSS}$ corresponds to the vertical position collected by the position vector collection module,
   $\eta_{GS_{ddm}}$ corresponds to the vertical offset measured by the offset measurement module in DDM and collected by the offset collection module,
   $\eta_{GS_{rad}}$ corresponds to the vertical offset measured by the offset measurement module in radians and collected by the offset collection module, $$\left(\eta_{GS_{ddm_{mem_i}}}\right)_{1 \le i \le N}$$

corresponds to a vector comprising at least one vertical offset $$\eta_{GS_{ddm_{mem_i}}}$$

measured in DDM, stored and collected in the vertical offset collection step in an iteration i prior to the current iteration,
N corresponding to a predetermined number of vertical offsets measured and stored in iterations prior to the current iteration, $$\left(\eta_{GS_{rad_{mem_i}}}\right)_{1\leq i\leq N}$$

corresponds to a vector comprising at least one vertical offset $$\eta_{GS_{ddm_{mem_i}}}$$

measured in radian, stored and collected in the vertical offset collection step in an iteration i prior to the current iteration, N corresponding to a predetermined number of vertical offsets measured and stored in iterations prior to the current iteration, $vz_{IRS}$ corresponds to the vertical velocity of the aircraft collected in the velocity vector collection step, $b_{vz_{IRS}}$ corresponds to a bias of the vertical velocity of the aircraft collected in the velocity vector collection step, dt corresponds to a time between two iterations, QFU corresponds to a geometric orientation of the runway, TCH corresponds to an altitude with respect to the threshold of the runway at which the vertical offset is zero, $x_{RWY}$ corresponds to a longitudinal distance between the aircraft and the threshold of the runway, collected by the position vector collection module, $x_{mem_i}$ corresponds to the longitudinal position collected in the position vector collection step and stored in an iteration prior to the current iteration, in the same iteration as the vertical offset $$\eta_{GS_{ddm_{mem_i}}},$$

$z_{mem_i}$ corresponds to the vertical position collected in the position vector collection step and stored in an iteration prior to the current iteration, in the same iteration as the vertical offset $$\eta_{GS_{ddm_{mem_i}}}.$$

8. The method according to claim 7, wherein the information determined in the information determination step furthermore comprises:
estimates of the following variables:
the vertical position of the aircraft with respect to the vertical position of the threshold of the runway,
the vertical offset in DDM of the aircraft,
the sensitivity factor,
the bias of the vertical position of the aircraft,
the bias of the vertical velocity of the aircraft;
innovation terms for the following variables:
the vertical position of the aircraft collected in the position vector collection step,
the vertical offset in DDM collected in the vertical offset collection step,
a vector comprising at least one vertical offset measured in DDM, stored and collected in the vertical offset collection step in an iteration prior to the current iteration;
an estimate error covariance matrix;
a covariance matrix associated with the innovation terms.

9. The method according to claim 6, wherein the diagnostic step comprises comparing each of the innovation terms determined in the information determination step with a threshold associated with the variable whose innovation term is determined, a fault with the position vector measurement module is detected if the innovation term for the position is greater than or equal to the associated threshold for a predetermined successive number of iterations, and a fault with the offset measurement module is detected if the innovation term for each of the offsets is greater than or equal to the associated threshold for a predetermined successive number of iterations.

10. The method according to claim 3, further comprising:
a diagnostic step, implemented by a diagnostic module, comprising validating or not validating the offset measurement module and the position vector measurement module based on the information determined in the information determination step, a measurement module being considered to be valid if no fault is detected with said measurement module, a measurement module being considered not to be valid if a fault is detected with said measurement module, the velocity vector inertial measurement module being considered to be always valid; and
a reconfiguration step, implemented by a reconfiguration module, comprising reconfiguring the estimator filter for a following iteration in order to eliminate a measurement performed by the one or more measurement modules considered not to be valid, and
a reclassification step, implemented by a reclassification module, comprising reclassifying the one or more measurement modules for which a fault was detected in the diagnostic step implemented in a previous iteration, the reclassification step preceding the reconfiguration step,
wherein the reclassification step comprises comparing each of the innovation terms determined in the information determination step with the predetermined associated threshold, a position vector measurement module is reclassified if the innovation term for the position is less than the associated threshold for a predetermined successive number of iterations, and an offset measurement module is reclassified if the innovation term for each of the offsets is less than the associated threshold for a predetermined successive number of iterations.

11. A system for estimating, during an approach procedure of an aircraft with a view to landing on a runway in accordance with a predefined approach towards said runway, an angular deviation of a reference guidance axis with respect to an approach axis corresponding to said predefined approach towards the runway, and also a position and a velocity of an aircraft with respect to the runway,
the approach procedure being performed using a landing assistance device, the landing assistance device comprising at least one transmitter station configured so as to transmit a reference guidance signal defining the reference guidance axis, the runway having a threshold,
the approach procedure comprising a capturing phase comprising making the aircraft converge towards the reference guidance axis and a tracking phase comprising guiding the aircraft along the reference guidance axis,
wherein the system comprises at least one set of modules implemented iteratively, the set of modules implemented in each iteration comprising:

an offset collection module configured to collect an offset measured by an offset measurement module based on the reference guidance signal transmitted by the transmitter station;

a position vector collection module configured to collect a position vector of the aircraft measured by a position vector measurement module based on signals transmitted by a geopositioning system, the position vector of the aircraft being expressed with respect to the threshold of the runway, the position vector comprising a longitudinal position, a lateral position and a vertical position;

a velocity vector collection module configured to collect a velocity vector of the aircraft measured by a velocity vector inertial measurement module, the velocity vector comprising a longitudinal velocity, a lateral velocity and a vertical velocity;

an information determination module configured to determine at least the following information, using an estimator filter, based on the position vector, based on the velocity vector, based on the offset determined in the current iteration and based at least on an offset determined and stored in at least one previous iteration:
- an estimate of the angular deviation of the reference guidance axis with respect to the approach axis towards the runway,
- an estimate of the position of the aircraft with respect to the runway and
- an estimate of the velocity of the aircraft with respect to the runway;

a storage module configured to store at least the offset and the position vector that are determined in the current iteration.

12. The system according to claim 11, further comprising:
a diagnostic module configured to validate or not validate the offset measurement module and the position vector measurement module based on the information determined by the information determination module, a measurement module being considered to be valid if no fault is detected with said measurement module, a measurement module being considered not to be valid if a fault is detected with said measurement module, the velocity vector inertial measurement module being considered to be always valid;

a reconfiguration module configured to reconfigure the estimator filter for the following iteration in order to eliminate a measurement performed by the one or more measurement modules considered not to be valid.

13. The system according to claim 12, further comprising a reclassification module configured so as to reclassify the one or more measurement modules for which a fault was detected by the diagnostic module implemented in a previous iteration.

14. An aircraft comprising an estimation system as specified according to claim 11.

* * * * *